(12) United States Patent
Zhou et al.

(10) Patent No.: US 11,339,849 B2
(45) Date of Patent: May 24, 2022

(54) THREE-DIMENSIONAL ISOLATOR WITH ADAPTIVE STIFFNESS PROPERTY (71) Applicant: Tongji University, Shanghai (CN)

(72) Inventors: Ying Zhou, Shanghai (CN); Peng Chen, Shanghai (CN)

(73) Assignee: Tongji University, Shanghai (CN)

( * ) Notice: Subject to any disclaimer, the term of this patent is extended or adjusted under 35 U.S.C. 154(b) by 636 days.

(21) Appl. No.: 16/317,977

(22) PCT Filed: Feb. 1, 2018

(86) PCT No.: PCT/CN2018/074901
§ 371 (c)(1),
(2) Date: Jan. 15, 2019

(87) PCT Pub. No.: WO2019/075959
PCT Pub. Date: Apr. 25, 2019

(65) Prior Publication Data
US 2021/0301900 A1 Sep. 30, 2021

Related U.S. Application Data
(63) Continuation of application No. PCT/CN2018/074901, filed on Feb. 1, 2018.

(30) Foreign Application Priority Data
Oct. 18, 2017 (CN) .......................... 201710969015.2

(51) Int. Cl.
E04H 9/02 (2006.01)
F16F 15/02 (2006.01)
(Continued)

(52) U.S. Cl.
CPC ......... *F16F 15/022* (2013.01); *E04H 9/0235* (2020.05); *E04H 9/0237* (2020.05);
(Continued)

(58) Field of Classification Search
CPC .... F16F 7/08; F16F 9/103; E04H 9/02; E01D 19/041; E04B 1/36; E04B 1/98
(Continued)

(56) References Cited

U.S. PATENT DOCUMENTS

3,794,277 A * 2/1974 Smedley .................. H02B 1/54
248/548
4,496,130 A * 1/1985 Toyama ............... B60G 99/002
248/585
(Continued)

Primary Examiner — Christopher P Schwartz (57) ABSTRACT

The present disclosure discloses a three-dimensional seismic and vibration isolator with adaptive stiffness property in both vertical and horizontal directions. The isolator comprises an upper connection plate, a middle plate, an lower connection plate, a disc spring, a pre-compressed helical springs, a laminated lead rubber bearing, and viscous dampers. The upper connection plate, the middle plate and lower connection plate are made of high strength low carbon steel. The upper connection plate and middle plate are tightly contacted by the occlusive design, to guide the vertical motion. The vertical isolation system is made up of the disc spring, pre-compressed helical spring, and viscous damper. The horizontal isolation system comprises the laminated lead rubber bearing, pre-compressed helical spring and viscous damper. The disclosure adopts the theory of non-linear adaptive vibration control technology and can be used to protect building structures or instruments from the seismic strikes or other environmental vibrations.

5 Claims, 9 Drawing Sheets (51) Int. Cl.
*F16F 15/023* (2006.01)
*F16F 1/00* (2006.01)

(52) U.S. Cl.
CPC ...... *F16F 15/023* (2013.01); *F16F 2228/066* (2013.01); *F16F 2238/026* (2013.01); *F16F 2238/04* (2013.01)

(58) Field of Classification Search
USPC ..... 52/167.1–167.7; 248/583, 585, 624, 636, 248/638; 267/140.2–140.5, 141.1, 141.4, 267/141.7
See application file for complete search history.

(56) References Cited

U.S. PATENT DOCUMENTS

| | | | | |
|---|---|---|---|---|
| 4,527,365 | A * | 7/1985 | Yoshizawa | F16F 7/08 267/154 |
| 4,991,366 | A * | 2/1991 | Teramura | E04H 9/021 188/136 |
| 5,286,013 | A * | 2/1994 | Seymour | F16F 9/103 188/316 |
| 5,324,117 | A * | 6/1994 | Matsushita | E04H 9/022 14/73.5 |
| 5,339,580 | A * | 8/1994 | Koshika | F16F 1/40 52/167.1 |
| 5,884,440 | A * | 3/1999 | Kubo | E04H 9/022 52/167.1 |
| 6,938,888 | B2 * | 9/2005 | Levallard | F16F 13/08 267/140.11 |
| 10,294,618 | B2 * | 5/2019 | Cho | F16F 15/04 |
| 10,662,645 | B2 * | 5/2020 | Kochiyama | E04H 9/02 |
| 2019/0315595 | A1 * | 10/2019 | Hattori | B66B 7/028 |

* cited by examiner

THREE-DIMENSIONAL ISOLATOR WITH ADAPTIVE STIFFNESS PROPERTY

CROSS REFERENCE TO RELATED PATENT APPLICATION

The present application is the US national stage of PCT/CN2018/074901 filed on Feb. 1, 2018, which claims the priority of the Chinese patent application No. 201710969015.2 filed on Oct. 18, 2017, which is incorporated herein by reference.

BACKGROUND OF THE PRESENT INVENTION

1. Field of Invention

The present disclosure is a new three-dimensional isolation system for buildings or large-scale facilities to reduce the seismic hazards or environment vibration harassment. It belongs to the field of vibration control of structures.

2. Description of Related Arts

Base isolation technology is considered one of the most significant inventions in the field of earthquake engineering in the $20^{th}$ century. Many isolated buildings have been built worldwide. The basic principle of the isolation technology is to set a soft isolation layer at the bottom of a building, generally by adopting seismic isolators to bear the upper gravity load and to reduce the horizontal stiffness. The isolation system works as a filtering system to mitigate the seismic induced acceleration response and dissipate input energy. Modern isolation technology has 60 years of history, and it belongs to a type of passive control strategy.

Nevertheless, the traditional seismic isolators have two main drawbacks: (1) Vertical earthquake or environment vibration cannot be reduced. Many field observation after earthquakes and numerical analysis have revealed that the vertical component of an earthquake would cause damage on structural components or non-structural component of a building. With the development of the city transit lines, the metro vibration, especially its vertical component would affect the living comfort of the residents. (2) The trade-off between isolation effect and isolation displacement. For most normal earthquakes, a better isolation effect can be obtained by designing a soft isolation layer to have a more extended natural period. However, this results in a larger displacement in isolation layer which would cause disastrous consequence if the displacement exceeds the safe range.

SUMMARY OF THE PRESENT INVENTION

In order to overcome the drawbacks mentioned above, the present disclosure discloses a novel three-dimensional (3D) isolator with adaptive stiffness, which can isolate vertical earthquake and micro environmental vibration and can have an optimized horizontal seismic isolation effect.

The present disclosure discloses a three-dimensional isolator with adaptive stiffness, comprising an upper connection plate (1), a middle plate (2), an lower connection plate (3), a disc spring (4), helical spring (5), a laminated lead rubber bearing (6), pre-compressed helical springs (7), and viscous dampers (8), Wherein the laminated lead rubber bearing is designed between the middle plate and the lower connection plate. One side of helical spring is placed at the first groove on the middle plate, and the disc spring is placed on the middle plate outside the helical spring. The other side of the helical spring inserts into the sleeve of the second groove on the upper connection plate to keep the working stability of the helical spring. The viscous dampers are designed symmetrically beside the middle plate with the two ends connecting the upper connection plate and the lower connection plate using the spherical hinges. Pre-stressed helical spring is set outside the viscous damper, and it can accommodate the relative displacement between the upper connection plate and the lower connection plate in horizontal. An inner lead core is designed at the center of the laminated lead rubber bearing to dissipate motion energy in horizontal and vertical directions. In the vertical direction of the 3D isolator, the disk spring and helical spring work in parallel. When the isolator is applied with the upper gravitational load, the disk spring can provide negative stiffness and helical spring provides positive stiffness. Thus, the vertical isolation system can have a quasi-zero stiffness property. In the horizontal direction of the 3D isolator, the laminated lead rubber bearing and pre-stressed helical spring work in parallel. The pre-stressed helical spring can provide negative stiffness when the horizontal displacement is small but positives stiffness when the horizontal displacement is large. The horizontal isolation system is characterized by adaptive stiffness by adding the pre-stressed helical spring.

In the present disclosure, the viscous dampers and lead core are added to dissipate the motion energy in both vertical and horizontal directions.

In the present disclosure, the upper connection plate and middle plate contact tightly with each other, to lock the relative horizontal and rotational motion.

The upper connection plate 1 and the middle plates 2 are tightly contacted by the occlusive design, to guide the vertical motion by constraining the relative displacement.

In the present disclosure, the disk spring, helical spring and outside pre-stressed helical spring can bear the upper gravity load together in parallel in both static and dynamic state.

In the present disclosure, the two connection ends of the pre-stressed helical spring are welded with the spherical hinge so that the helical spring can provide tensile force for the isolation system.

In the present disclosure, the upper connection plate and the middle plate are contacted tightly by the occlusive design, to decouple the vertical and horizontal motion in the isolator. The occlusive design between the upper and middle plate can lock the relative horizontal and rotational motion to allow only relative vertical displacement between the upper connection plate and the middle plate. Thus, the present disclosure decouples the horizontal and vertical displacement, which means the vertical displacement only occurs between the upper connection plate and the middle plate, and the horizontal displacement only occurs between the middle plate and the lower connection plate. Due to the occlusive design, the vertical and the horizontal isolation system can work independently, and the rocking behavior can be avoided by locking the relative rotational motion.

In the present disclosure, in the vertical direction of the isolator, the helical spring and disk spring work in parallel. When the gravity load of super-structure applies on the top of the isolator at a gravity balance state, the disk spring deforms near the flat position. At the flat position, the disk spring can provide negative stiffness. Combined with the positives stiffness provided by the helical spring, the vertical isolation system can have the quasi-zero stiffness property, thus can effectively isolate the vertical earthquake component and environmental vibrations.

In the present disclosure, in the horizontal direction of the isolator, the pre-stressed helical spring and laminated lead rubber bearing work in parallel. Due to the pre-stressed load in the helical spring, it can provide negatives stiffness when the horizontal displacement is small to obtain better isolation effect and provide positive stiffness when the displacement is significant to help prevent overly large displacement.

In the present disclosure, the viscous dampers are placed vertically to connect the upper and lower connection plate, thus to dissipate the horizontal and vertical motion energy.

In the present disclosure, a viscous damper is placed inside the pre-stressed helical spring to keep the working stability of the spring.

The principle of the present disclosure is illustrated as follows.

The present disclosure introduces adaptive stiffness design to improve the isolation performance of the traditional laminated lead rubber bearing (prior art). The adaptive stiffness technology belongs to a kind of nonlinear passive vibration control strategy, which means the stiffness of the system can vary with the displacement. For the present disclosure, the adaptive stiffness property means the system can provide little stiffness when the displacement is small, but large stiffness when the displacement is large.

In the vertical direction of the isolator, the quasi-zero stiffness isolation system (also characterized by adaptive stiffness property) is obtained by the parallel combination of the disk spring and helical spring. Quasi-zero stiffness (QZS) system means that the stiffness of the system is approximate to zero at the gravity balance state. The quasi-zero stiffness system is a kind of strong nonlinear isolation system which can adequately solve the contradiction between satisfactory isolation effect and high gravity loading capacity which exists in traditional linear isolation system. Besides, the QZS system is kind of passive system that can obtain high-static but low-dynamic stiffness without external energy input. The vertical isolation system can have a good isolation performance for seismic and environment vibrations. Meanwhile, it can well control the overly large vertical displacement.

And in the horizontal direction of the isolator, the adaptive stiffness isolation system consists of the parallel combination of the laminated lead rubber bearing and pre-stressed helical springs. The laminated lead rubber bearing can support the top load and provide main restoring capability for the system. The additional pre-stressed device can give the adaptive property to the system by providing negative stiffness at small displacement state, and positive stiffness at large displacement state.

For the present disclosure, the size and mechanic parameters of the components, including the disk spring, helical spring, pre-stressed helical spring, laminated lead rubber bearing, etc., can be designed accordingly based on the engineering requirement. The disclosure has good feasibility and a promising application prospect.

Compared with the existing seismic isolators or vibration reduction technologies (such as traditional laminated rubber isolator, friction pendulum bearing), the advantages of the present disclosure are:
(1) The present disclosure can isolate earthquakes or environment vibrations in three directions. Both the horizontal and vertical isolation systems are characterized by the adaptive stiffness property which has a superior isolation effect than traditional techniques.
(2) The present disclosure can better ensure the isolation safety under most unfavorable considered earthquakes or drastic impact. The adaptive property allows the isolation system to have larger restoring stiffness to help constrain the excessive isolation displacement.
(3) Viscous dampers and the lead core can work together to dissipate earthquake energy.

The illustration of the numbers in the figures:
1 upper connection plate,
101 inner radius of the second groove,
102 inner sleeve
2 middle plate,
201 outer radius of the middle plate,
202 inner radius of the middle plate,
3 lower connection plate,
4 disc spring,
5 helical spring,
6 laminated lead rubber bearing,
7 pre-stressed helical spring,
8 viscous damper,
9 spherical hinge,
10 upper embedded part,
11 under embedded part,
12 the upper isolation layer column,
13 the under isolation layer column,
14 guide rod,
15 valve,
16 damping hole,
17 viscous liquid,
18 upper seal plate of the laminated lead rubber bearing,
19 lead core,
20 under seal plate of the laminated lead rubber bearing,
21 rubber layer,
22 steel layer,
23 outer layer of rubber covering.

DETAILED DESCRIPTION OF THE PREFERRED EMBODIMENTS

Embodiment 1

The present disclosure is further explained in detail according to the accompanying drawings. The present disclosure reveals a three-dimensional seismic and vibration isolator with adaptive stiffness property according to FIG. 1 to FIG. 7.

Figure 1:
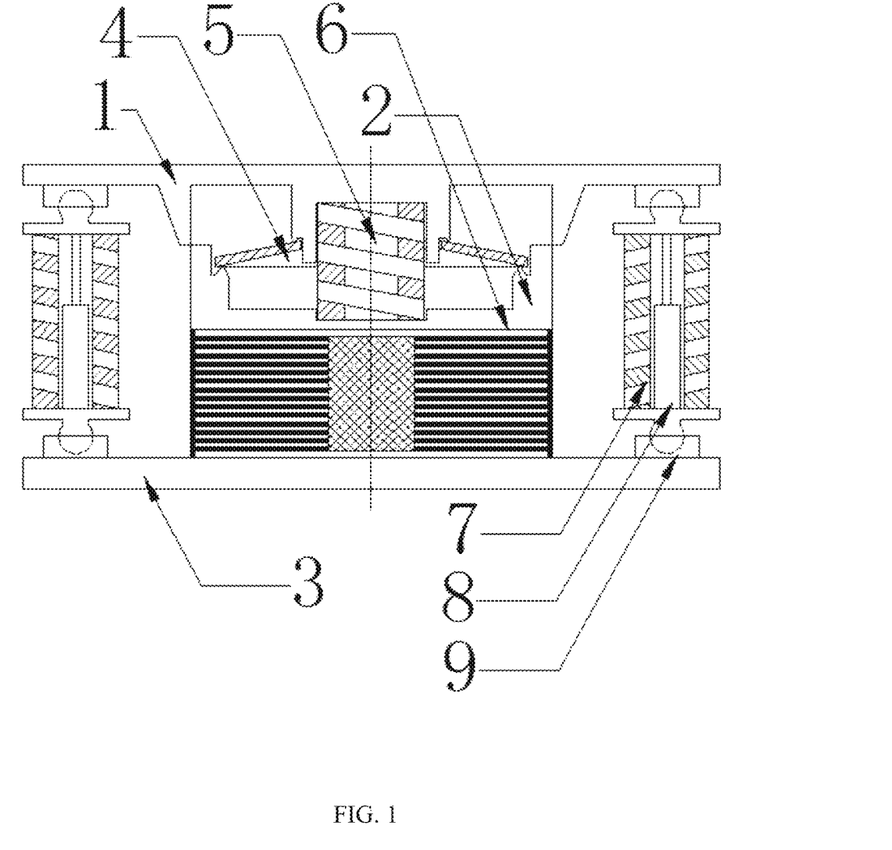
FIG. 1 is a cross-section view of the present embodiment in initial state.

Referring to FIG. 1 of the drawings, the disclosure of the three-dimensional isolator with adaptive stiffness property, includes an upper connection plate 1, a middle plate 2, an lower connection plate 3, a disc spring 4, helical spring 5, a laminated lead rubber bearing 6, pre-stressed helical spring 7, viscous damper 8 and spherical hinge 9. The disk spring 4, the helical spring 5 and the laminated lead rubber bearing 6 work in parallel as the vertical quasi-zero stiffness (QZS) isolation system. The laminated lead rubber bearing 6 and the two springs are vertically connected in series to support the upper gravity load. The viscous damper 8 is set inside the pre-stressed helical spring 7. The top and bottom ends of the viscous damper 8 and pre-stressed helical spring 7 all are connected with spherical hinge 9, thus both to connect the upper connection plate 1 and lower connection plate 3, also to accommodate relative motion in any directions.

The upper connection plate 1 and the middle plate 2 are contacted tight by occlusive design to allow only relative vertical motion.

The vertical gravity load of the isolated structure is transmitted to the upper connection plate 1 and then supported by the disc spring 4, the helical spring 5, and pre-stressed spring 7 together. Each of the viscous dampers 8 does not provide damping force in the static state. The helical spring 5, the upper connection plate 1, the middle plate 2, the pre-stressed helical spring 7 and the spherical hinge 9, all are connected using soldering so that the helical spring 5 and pre-stressed helical spring 7 can provide force in the tensile direction. The telescopic viscous damper is set inside the pre-stressed helical spring and also connects both ends in welded connection to keep the work stability and can provide damping force in the tensile direction. The spherical hinge 9 is designed to connect the combination of the pre-stressed helical spring 7 and the viscous damper 8 with the upper connection plate 1 and the lower connection plate 3, to accommodate relative motion between the two plates in any directions. The laminated lead rubber bearing 6 is connected tightly with the middle plate 2 and connection plate 3 using high-strength bolts.

Figure 2:
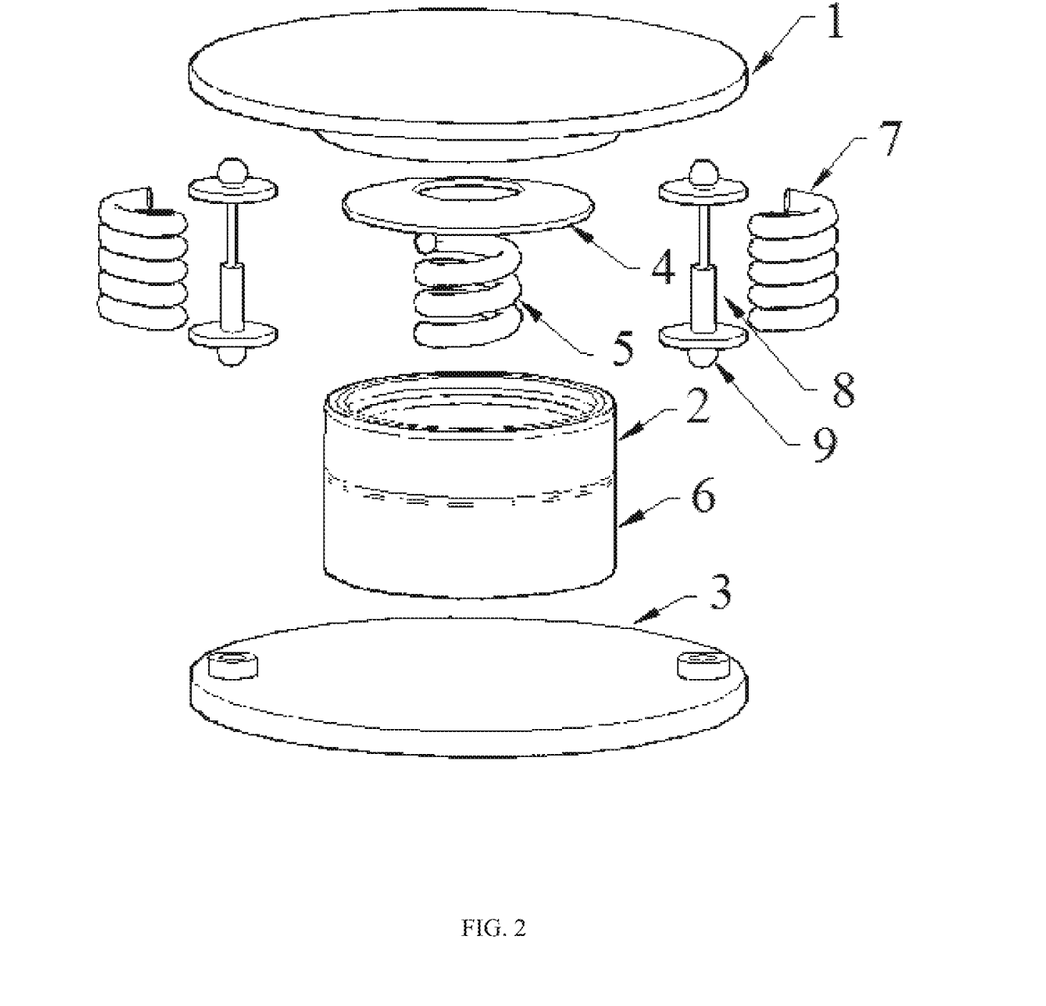
FIG. 2 is a three-dimensional assembly drawing of the present embodiment.

Referring to FIG. 2 of the drawings, the assembly diagram of the present disclosure is shown in the 3D view.

Figure 3:
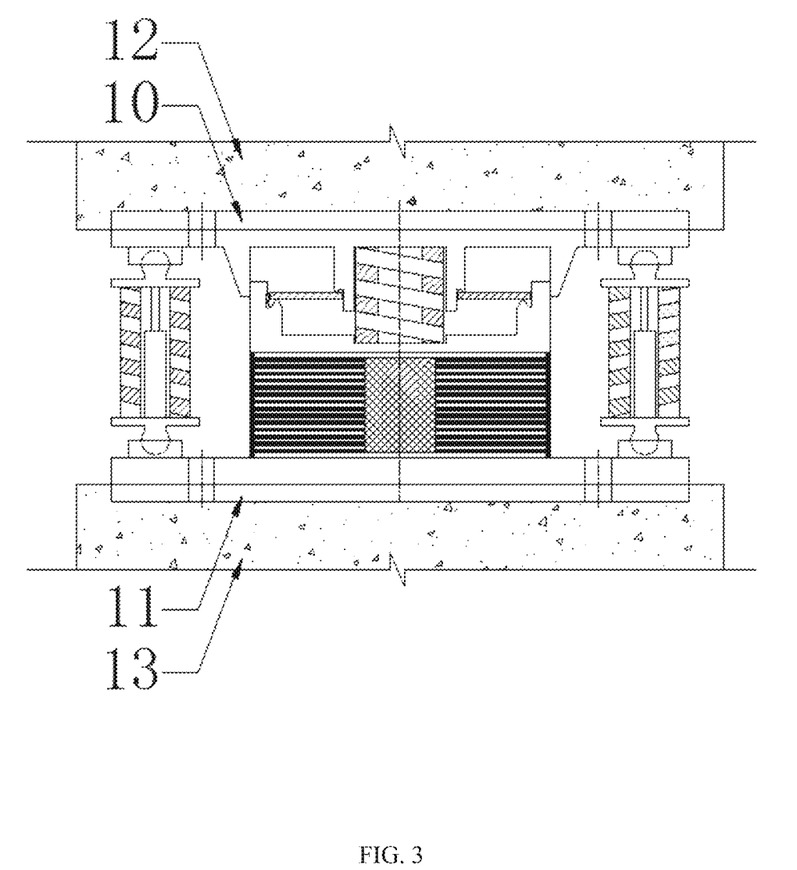
FIG. 3 is an installation schematic view of the embodiment, and a schematic view of the isolation layer.

Referring to FIG. 3 of the drawings, the present disclosure is installed in the isolation layer at the base of a building structure. The upper embedded part 10 and the under embedded part 11 are embedded into the bottom of the upper isolation layer column 12 and under isolation layer column 13 respectively before casting the concrete. Based on the loading capacity design, the disc spring 4 is deformed at around its flat position. The helical spring 5 and pre-stressed helical spring 7 also support the vertical gravitational load.

Figure 4:
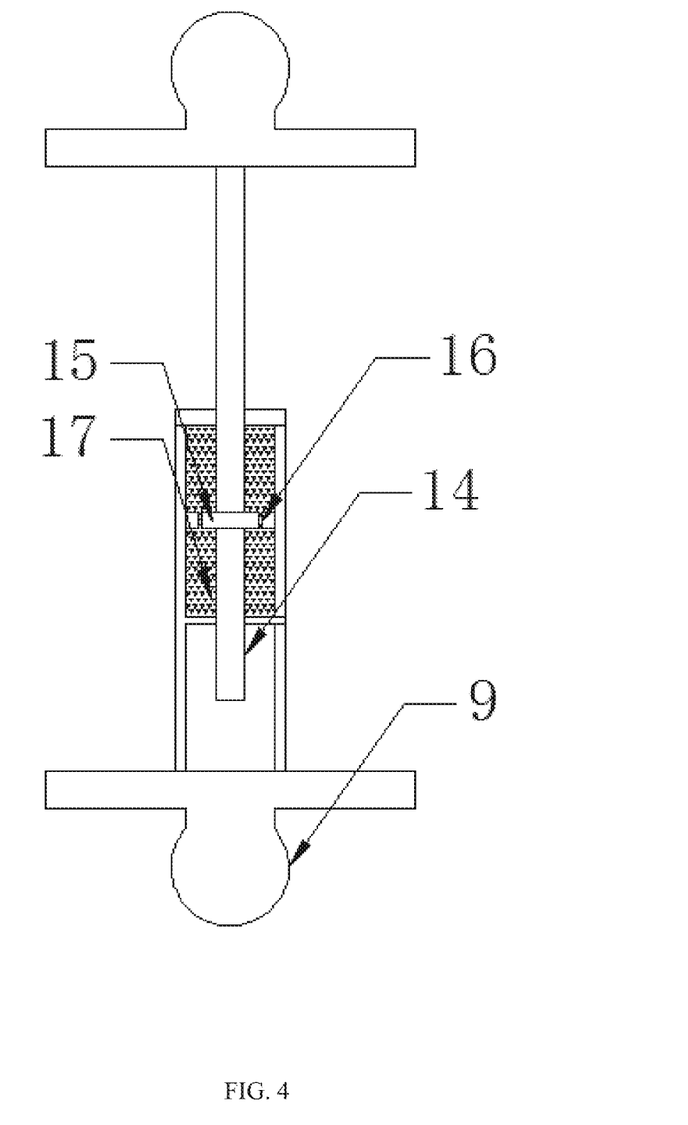
FIG. 4 is a schematic structure view of the viscous damper.

Referring to FIG. 4 of the drawings, the assembly of the viscous damper 8 of the present disclosure is shown. The guide rod 14 connects tightly with the valve 15, to put the valve in motion within the viscous liquid 17 to dissipate the motion energy when the viscous liquid 17 flow through the damping holes 16 on the valve 15.

Figure 5:
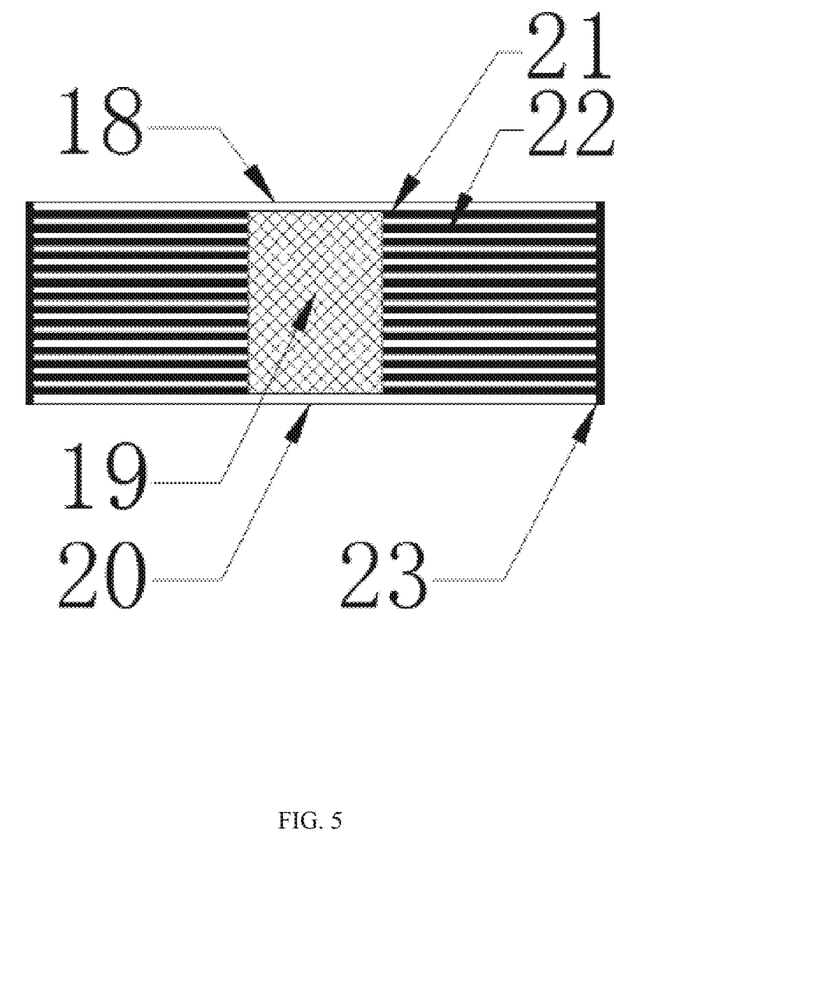
FIG. 5 is a schematic structure view of the laminated lead rubber bearing.

Referring to FIG. 5 of the drawings, it shows the assembly of the laminated lead bearing 6 of the present disclosure. The upper seal plate 18 and under seal plate 20 can connect the bearing with other components. The outer rubber cover layer 23 can protect the bearing (lead core 19, rubber layers 21 and steel layers 22) from the environment, to enhance the durability of the bearing.

Figure 5A:
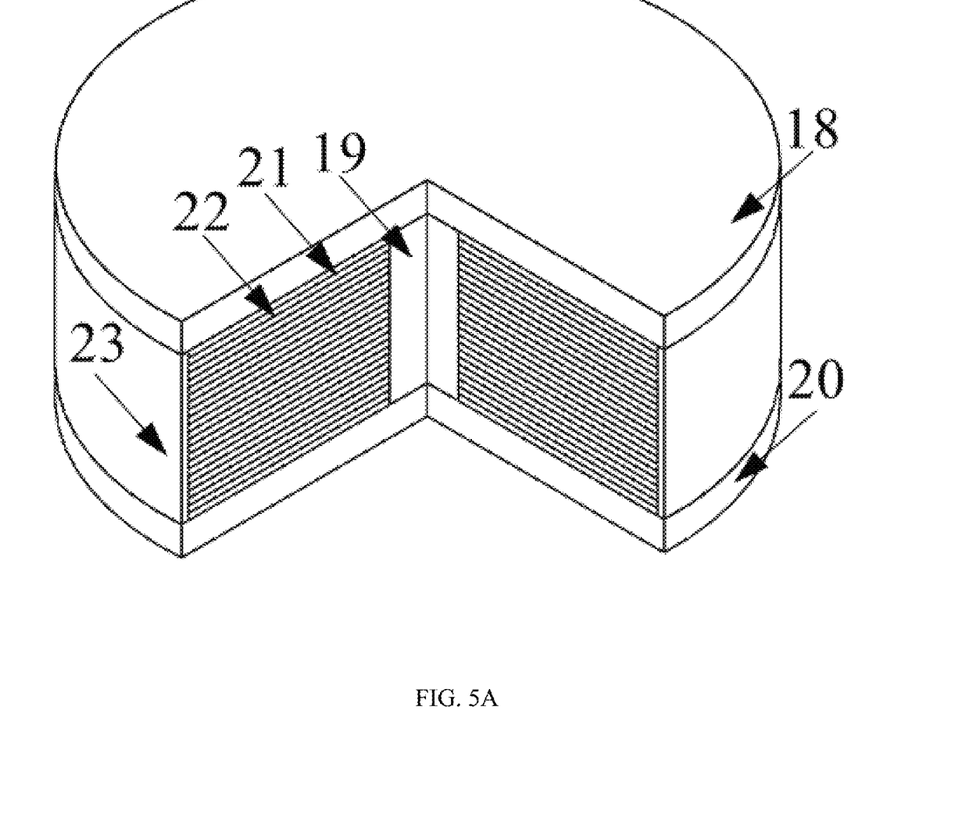
FIG. 5A is a cross-section view of the laminated lead rubber bearing.
Figure 5B:
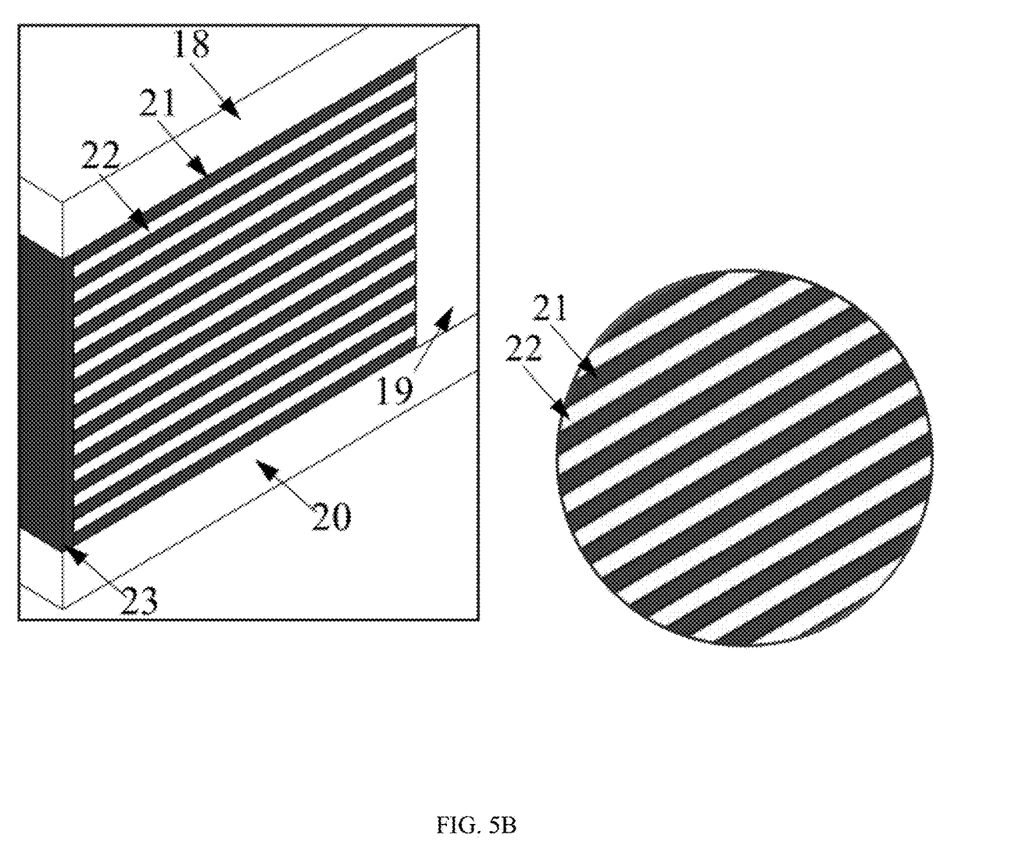
FIG. 5B is a blown up view of the laminated lead rubber bearing.

The laminated lead rubber bearing consists of alternating laminations of thin rubber layers (21) and steel plates (22), bonded together to provide vertical rigidity and horizontal flexibility. The outer rubber layer (23) protects rubber laminations against ultraviolet rays and ozone exposure that deteriorate rubber. The upper connection plate (18) and the bottom connection plate (20) are designed to connect the bearing with other components. Laminated lead rubber bearing that has a lead plug (19) embedded at the center, the lead plug can provide damping capacity to dissipate motion energy.

Embodiment 2

Further Innovation of Embodiments

Figure 6:
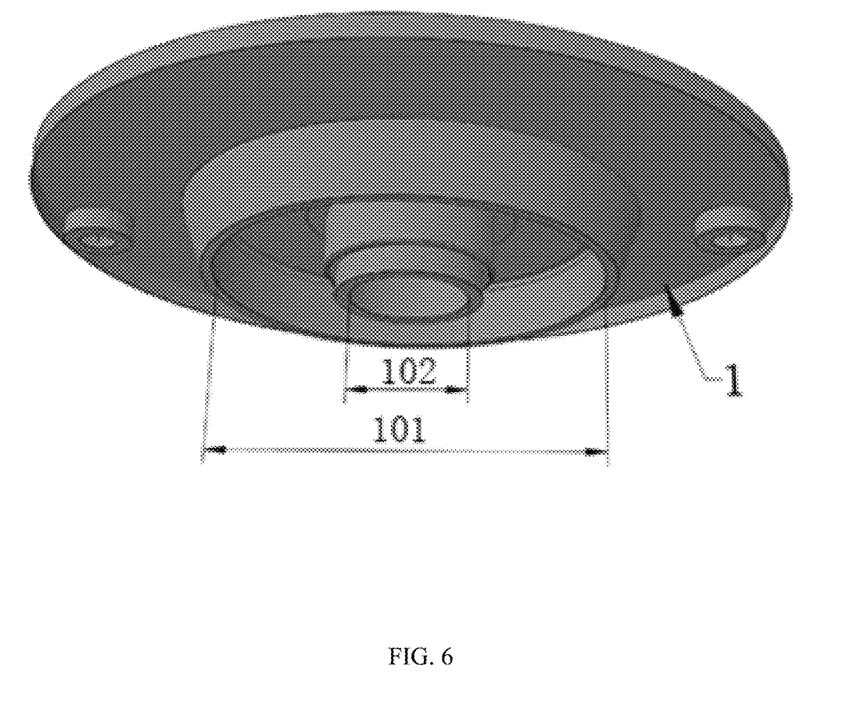
FIG. 6 is a three-dimensional view of the upper connection plate.
Figure 7:
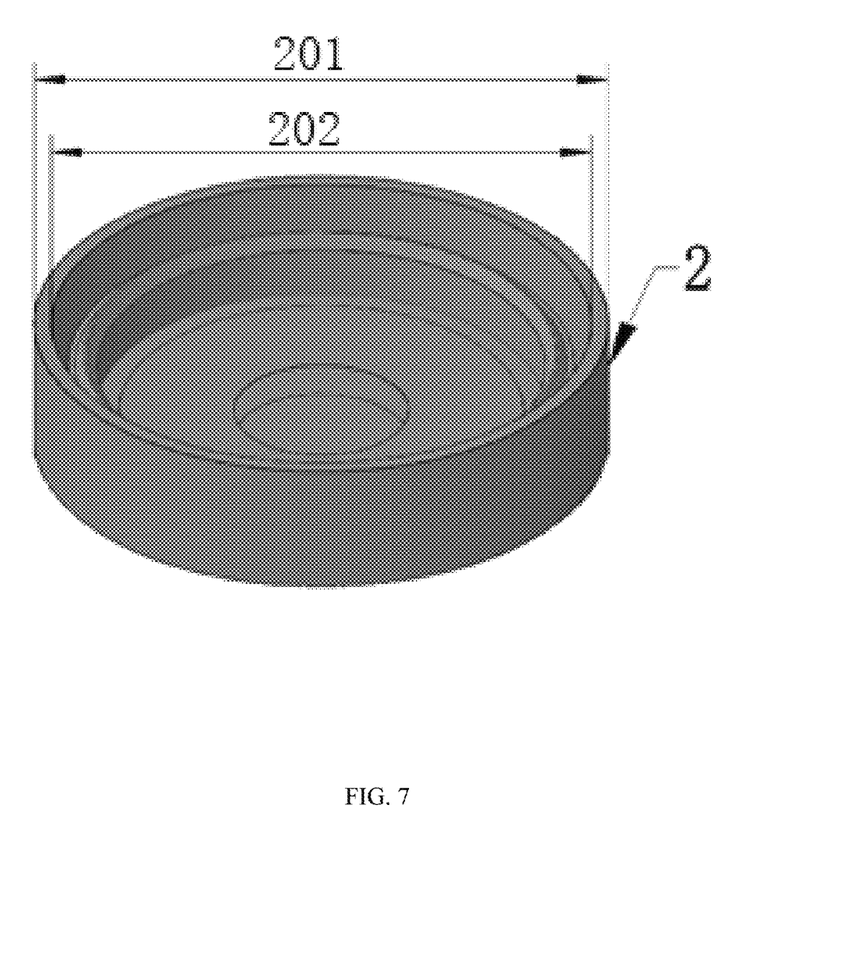
FIG. 7 is a three-dimensional view of the middle plate.

In this further disclosure, the upper connection plate 1 and middle plate 2 contact tightly with each other, to lock the relative horizontal and rotational motion. Thus, only relative vertical displacement is allowed, which also means that the present disclosure decouples the vertical and horizontal motion.

Referring to FIG. 6 and FIG. 7, the outer radius 201 of the middle plate 2 and the inner radius 101 of the second groove of the upper connection plate 1 is equal. The middle plate 2 can tightly embed into the second groove of upper connection plate 1. The engagement of the two plates can lock the relative horizontal and rotational motion.

Specifically for example, when the present disclosure of three-dimensional isolator with adaptive stiffness property supports the gravity load of the upper building, relative vertical displacement occurs between the upper connection plate 1 and the middle plate 2 and the two plates contact tightly. The engagement due to the gravity load can lock the relative horizontal and rotational motion, thus to realize the motion decoupling between the horizontal and vertical directions.

What is claimed is:

1. A three-dimensional isolator with adaptive stiffness property, comprising:
   an upper connection plate (1), a middle plate (2), a lower connection plate (3), a disc spring (4), helical spring (5), a laminated lead rubber bearing (6), pre-compressed helical springs (7), and viscous dampers (8), wherein
   the laminated lead rubber bearing (6) connects the middle plate (2) and the lower connection plate (3);
   a first groove provided at the top of the middle plate (2) and a second groove is provided at the bottom of the upper connection plate (1);
   the helical spring (5) is insertable into two grooves and get through the disc spring (4) from the inner hole;
   the disc spring (4) and helical spring (5) transfer force between the middle plate (2) and the upper connection plate (1);
   the viscous dampers (8) are symmetrical on both side of the middle plate (2); both ends of the viscous damper (8) are respectively fixed to the bottom of the upper connection plate and the top of the lower connection plate, using spherical hinges (9); the spherical hinge (9) can accommodate relative displacement between the upper connection plate (1) and the lower connection plate (3) in horizontal; the pre-compressed helical springs (7) is set at the outside of the damper (8) and welded to the spherical hinge (9) so that it can carry load both in compression and tension state;
   an inner lead core (19) is at the center of the laminated lead rubber bearing (6) to dissipate motion energy in horizontal and vertical directions;
   when working, in the vertical direction of the isolator, the disc spring (4) provides negative stiffness, the helical spring (5) provides positive stiffness, the disc spring (4) and helical spring (5) provide quasi-zero stiffness together;

in the horizontal direction, the laminated lead rubber bearing (6) and pre-stressed helical spring (7) work in parallel; the pre-stressed helical spring (7) is an adaptive stiffness device; when the horizontal displacement of the isolator is small, the spring can provide negative stiffness to optimize the isolation effect, but when the displacement is large, it can provide positive stiffness to help constrain excessive displacement.

2. The three-dimensional isolator with adaptive stiffness property of claim 1, wherein the viscous dampers (8) and lead core (19) are added to dissipate the motion energy in both vertical and horizontal directions.

3. The three-dimensional isolator with adaptive stiffness property of claim 1, wherein the upper connection plate (1) and middle plate (2) are in contact tightly with each other, to lock the relative horizontal and rotational motion.

4. The three-dimensional isolator with adaptive stiffness property of claim 1, wherein the two connection ends of the pre-stressed helical spring (7) are welded with the spherical hinge (9) so that the helical spring (7) can provide tensile force for the isolation system.

5. The three-dimensional isolator with adaptive stiffness property of claim 1, wherein an outer radius (201) of the middle plate (2) and an inner radius (101) of the second groove of the upper connection plate (1) is equal; the middle plate (2) can tightly embed into the second groove; the engagement of the two plates can lock the relative horizontal and rotational motion;

when a gravity load is applied, the static relative vertical displacement between the upper connection plate and the middle plate occurs, and the upper connection plate and the middle plate interlock each other in the horizontal direction.

\* \* \* \* \*